US011412669B2

(12) United States Patent
Vilgiate

(10) Patent No.: US 11,412,669 B2
(45) Date of Patent: Aug. 16, 2022

(54) ELECTRICALLY ISOLATING BAFFLE FOR HORTICULTURE GROW LIGHT

(71) Applicant: CABATech, LLC, Encino, CA (US)

(72) Inventor: Anthony Wendell Vilgiate, Woodland Park, CO (US)

(73) Assignee: CABATECH, LLC, Encino, CA (US)

( * ) Notice: Subject to any disclaimer, the term of this patent is extended or adjusted under 35 U.S.C. 154(b) by 0 days.

(21) Appl. No.: 17/601,915

(22) PCT Filed: May 10, 2021

(86) PCT No.: PCT/US2021/031648
§ 371 (c)(1),
(2) Date: Oct. 6, 2021

(87) PCT Pub. No.: WO2021/231334
PCT Pub. Date: Nov. 18, 2021

(65) Prior Publication Data
US 2022/0151164 A1 May 19, 2022

Related U.S. Application Data

(60) Provisional application No. 63/024,879, filed on May 14, 2020.

(51) Int. Cl.
*A01G 9/24* (2006.01)
*F21V 29/76* (2015.01)
(Continued)

(52) U.S. Cl.
CPC ............ *A01G 9/249* (2019.05); *F21V 23/002* (2013.01); *F21V 29/67* (2015.01); *F21V 29/76* (2015.01);
(Continued)

(58) Field of Classification Search
CPC combination set(s) only.
See application file for complete search history.

(56) References Cited

U.S. PATENT DOCUMENTS 9,445,551 B2    9/2016  Chapman et al.
10,006,619 B1 *  6/2018  Niemiec ................. F24F 7/007
(Continued)

FOREIGN PATENT DOCUMENTS

AU         2019100276 A4    5/2019
CA            2342649 A1 * 10/2002  ............. A01G 7/045
WO     WO-2007147242 A1 * 12/2007  ............. A01G 7/045

OTHER PUBLICATIONS

Search Report issued in corresponding International Application No. PCT/US2021/031648, dated Aug. 6, 2021, 3 pages.
(Continued)

*Primary Examiner* — Alexander K Garlen
(74) *Attorney, Agent, or Firm* — Lewis Roca Rothgerber Christie LLP

(57) ABSTRACT

A horticulture grow light includes: an emitter array; a heatsink on one side of the emitter array; a driver electrically connected to the emitter array; and an electrically isolating baffle connected to the heatsink. The baffle includes: an air funnel; a plurality of driver panels respectively connected at opposite sides of the air funnel and extending toward the heatsink; and a plurality of support panels respectively connected to the driver panels and extending toward the heatsink. A first active airflow section is formed between inner surfaces of the driver panels and inner surfaces of the support panels, and second active airflow sections are respectively formed on either side of the first active airflow section and between the inner surfaces of the driver panels and outer surfaces of the support panels.

20 Claims, 7 Drawing Sheets

(51) Int. Cl.
*F21V 29/67* (2015.01)
*F21V 23/00* (2015.01)
*F21Y 115/10* (2016.01)
*F21Y 105/16* (2016.01)

(52) U.S. Cl.
CPC ....... *F21Y 2105/16* (2016.08); *F21Y 2115/10* (2016.08)

(56) References Cited

U.S. PATENT DOCUMENTS

| | | | |
|---|---|---|---|
| 2012/0326610 A1* | 12/2012 | Lawyer | H05B 45/56 |
| | | | 315/117 |
| 2015/0116997 A1 | 4/2015 | Tappert et al. | |
| 2015/0198321 A1* | 7/2015 | Druchinin | F21V 29/56 |
| | | | 362/294 |
| 2017/0211801 A1* | 7/2017 | Stanley | A01G 7/045 |
| 2018/0180052 A1* | 6/2018 | Niemiec | F21V 29/677 |
| 2018/0184628 A1* | 7/2018 | Lawyer | H05B 45/20 |
| 2019/0072288 A1* | 3/2019 | Niemiec | C08G 63/672 |
| 2019/0113219 A1* | 4/2019 | Niemiec | F21V 29/677 |
| 2019/0239444 A1 | 8/2019 | Hanson et al. | |
| 2019/0257314 A1* | 8/2019 | Niemiec | F21V 33/0092 |
| 2019/0292315 A1* | 9/2019 | Niemiec | C08G 81/00 |
| 2020/0037585 A1* | 2/2020 | Lawyer | A01K 63/06 |

OTHER PUBLICATIONS

Written Opinion issued in corresponding International Application No. PCT/US2021/031648, dated Aug. 6, 2021, 4 pages.

* cited by examiner

ELECTRICALLY ISOLATING BAFFLE FOR HORTICULTURE GROW LIGHT

CROSS-REFERENCE TO RELATED APPLICATIONS

This application is a U.S. National Phase Patent Application of International Application PCT/US2021/031648, filed on May 10, 2021, which claims priority to and the benefit of U.S. Provisional Patent Application Ser. No. 63/024,879, filed on May 14, 2020, in the United States Patent and Trademark Office, the entire content of both of which are incorporated herein by reference.

The present application is related to International Patent Application No. PCT/US2016/054522, filed Sep. 29, 2017, issued as U.S. Pat. Nos. 9,820,447, 10,159,198, and 10,785,921, the contents of each of which are incorporated herein by reference in their entirety.

BACKGROUND

1. Field

Aspects of embodiments of the present disclosure are related to an electrically isolating baffle for a horticulture grow light, a horticulture grow light including the electrically isolating baffle, and an air direction system for a horticulture grow light.

2. Related Art

As climate change increasingly reduces or relocates arable land while the need for food production continues to increase, there is a push to move aspects of crop growing indoors. In other situations, certain crops are grown away from their usual (or native) geographic locations to reduce the need to ship crops long distances to consumers.

In these situations, horticulture grow lights (hereafter referred to as "grow lights") are generally used to supplement (or replace) natural light. Such grow lights generally include a light source, one or more drivers (e.g., DC power drivers) to power the light source, and a heatsink to dissipate heat from the light source and the driver or drivers. One example of such a grow light is described in PCT/US2016/054522, the content of which is incorporated herein by reference in its entirety.

Often, in addition to the grow lights, large ceiling fans or building-wide HVAC systems are installed in green houses or indoor farms to circulate air. But such fans and HVAC systems only incidentally cool the grow lights, which can result in the grow lights overheating, can shorten their lifespan, or cause them to operate inefficiently. Further, in colder environments or when growing cold-weather tolerate crops, such fans may be unnecessary or may be even overchill a building, making it uncomfortable for workers.

However, simply attaching (or mounting) a fan onto a grow light is not a simple matter. For example, the moving parts of the fan in close proximity to electrical wires powering the light source poses an electrocution risk to workers by, for example, frayed wires or the like.

SUMMARY

According to embodiments of the present disclosure, an electrically isolating baffle is mounted on a horticulture grow light, which allows for an active cooling device, which may be mounted to the baffle, to safely and efficiently cool the grow light while ensuring worker safety from frayed or exposed wires and moving parts. The baffle provides separate active airflow sections to provide efficient cooling of the grow light by, for example, preventing or substantially preventing the formation of a boundary layer of air, while also isolating moving parts of an active cooling system (e.g., one or more fans) from drivers and associated electrical wiring to power the grow light. The different active airflow sections prevent or substantially prevent the formation of boundary layer air that would reduce the cooling efficiency of the active cooling device. Further, by isolating (or separating) the electrical components from any moving parts of the active cooling device, additional venting can be added to a fan shroud around the baffle, the active cooling device, the drivers, and the electrical wiring to cooling these components without affecting or substantially affecting the active cooling of the grow light.

According to an embodiment of the present disclosure, a horticulture grow light includes: an emitter array; a heatsink on one side of the emitter array; a driver electrically connected to the emitter array; and an electrically isolating baffle connected to the heatsink. The baffle includes: an air funnel; a plurality of driver panels respectively connected at opposite sides of the air funnel and extending toward the heatsink; and a plurality of support panels respectively connected to the driver panels and extending toward the heatsink. A first active airflow section is formed between inner surfaces of the driver panels and inner surfaces of the support panels, and second active airflow sections are respectively formed on either side of the first active airflow section and between the inner surfaces of the driver panels and outer surfaces of the support panels.

The heatsink may include a plurality of channels extending in a first direction and arranged adjacent each other in a second direction perpendicular to the first direction, and each of the driver panels may extend toward the heatsink at an angle between 30° and 60° with respect to the first direction.

The support panels may be respectively connected to the driver panels at an area between a proximal end and a distal end of the driver panels.

Each of the driver panels may include an electrical conduit channel at the distal end thereof.

The electrical conduit channels may contact the heatsink.

The electrical conduit channels may have openings therein, and the heatsink may be connected to the baffle via hollow bolts passing through the openings in the electrical conduit channels.

The driver may be mounted on one of the driver panels, and electrical wiring between the driver and the emitter array may pass through at least one of the hollow bolts.

A width of the first active airflow section first may increase in a first direction from the air funnel toward the heatsink and then decreases in the first direction.

A width of each of the second active airflow sections may increase in the first direction.

The support panels may separate the first active airflow section from the respective second active airflow sections.

Air flows from the first active airflow section, through the heatsink and under one of the support panels, and into a corresponding one of the second active airflow sections before exiting the heatsink.

According to an embodiment of the present disclosure, an air direction system for a horticulture grow light includes: a fan shroud; and an electrically isolating baffle under the fan shroud. The baffle includes: an air funnel; a plurality of driver panels extending from opposite sides of the air funnel; and a plurality of support panels respectively extending from the driver panels.

The driver panels may extend at an angle between 30° and 60° with respect to a bottom of the air funnel, and the support panels may respectively extend from the driver panels at an angle between 60° and 120°.

Each of the driver panels may include a driver support panel and an electrical conduit channel, and the electrical conduit channel may be at a distal end of the driver support panel.

Each of the electrical conduit channels may have a U-shaped cross-section with a plurality of openings extending through a bottom surface of the U-shaped cross-section.

The support panels may be mounted to the driver support panels of the respective driver panels.

A distal end of the support panels may be on a same plane as the bottom of the electrical conduit channels.

A first active airflow section may be formed between inner surfaces of the driver panels and inner surfaces of the support panel, and a plurality of second active airflow sections may be formed on opposite sides of the first active airflow section.

One of the second active airflow sections may be formed between the inner surface of one of the driver panels and an outer surface of a corresponding one of the support panels.

A volume of the first active airflow section may be greater than a volume of one of the second active airflow sections.

BRIEF DESCRIPTION OF THE DRAWINGS

These and other aspects and features of the present disclosure will be further appreciated and better understood with reference to the specification, claims, and appended drawings, in which:

DETAILED DESCRIPTION

Figure 1:
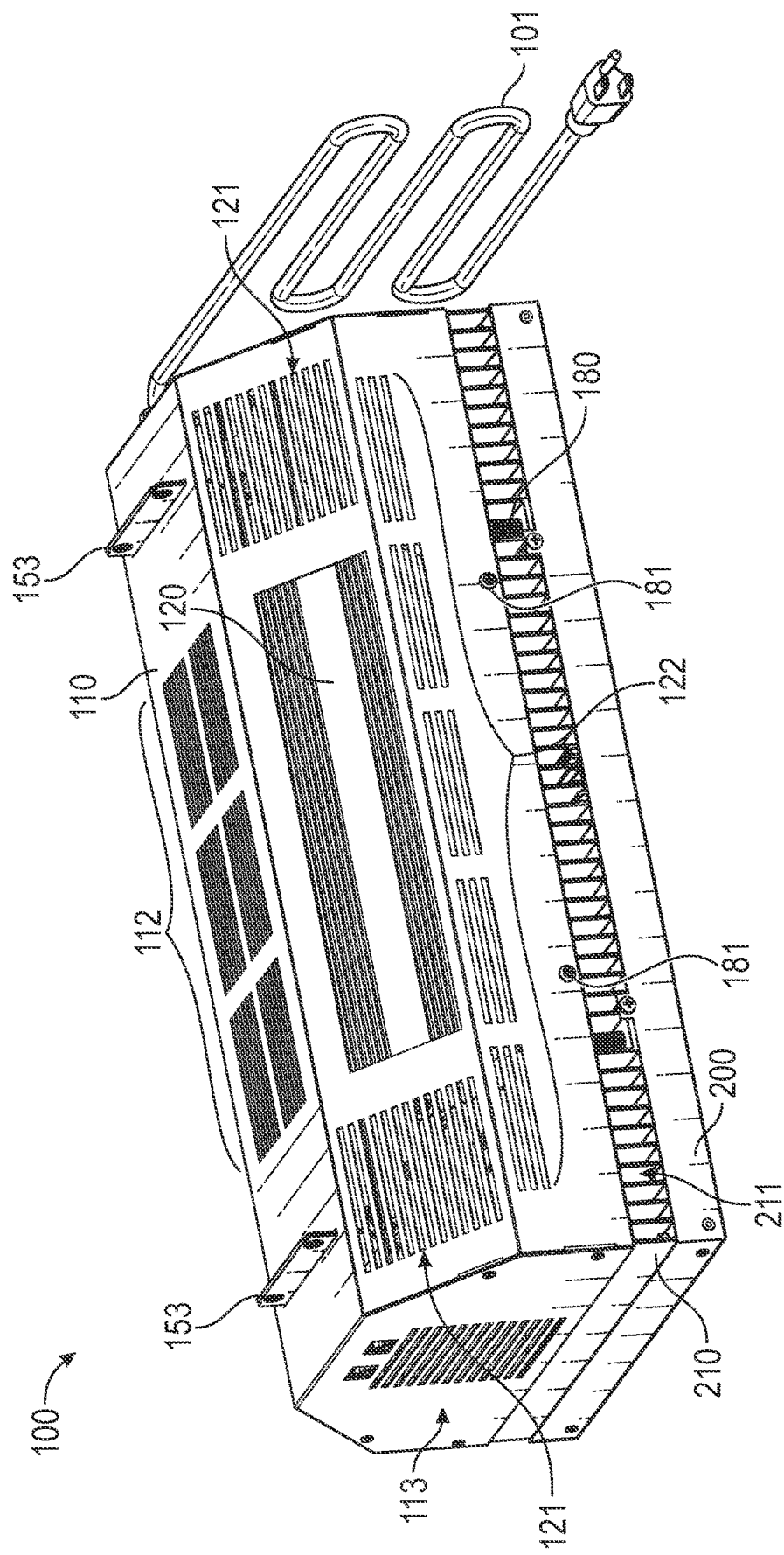
FIG. 1 is a perspective view of a fan shroud covering an electrically isolating baffle, both of which are mounted to a horticulture grow light, according to an embodiment of the present disclosure.

Hereinafter, example embodiments of the present disclosure will be described, in more detail, with reference to the accompanying drawings. The present disclosure, however, may be embodied in various different forms and should not be construed as being limited to only the embodiments illustrated herein. Rather, these embodiments are provided as examples so that this disclosure will be thorough and complete and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

It will be understood that, although the terms "first," "second," "third," etc., may be used herein to describe various elements, components, and/or layers, these elements, components, and/or layers should not be limited by these terms. These terms are used to distinguish one element, component, or layer from another element, component, or layer. Thus, a first element, component, or layer described below could be termed a second element, component, or layer without departing from the scope of the present disclosure.

It will be understood that when an element or component is referred to as being "connected to" or "coupled to" another element or component, it may be directly connected or coupled to the other element or component or one or more intervening elements or components may also be present. When an element or component is referred to as being "directly connected to" or "directly coupled to" another element or component, there are no intervening element or component present. For example, when a first element is described as being "coupled" or "connected" to a second element, the first element may be directly coupled or connected to the second element or the first element may be indirectly coupled or connected to the second element via one or more intervening elements.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components but do not preclude the presence or addition of one or more other features, integers, steps, operations, elements, components, and/or groups thereof. That is, the processes, methods, and algorithms described herein are not limited to the operations indicated and may include additional operations or may omit some operations, and the order of the operations may vary according to some embodiments. As used herein, the term "and/or" includes any and all combinations of one or more of the associated listed items.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "example" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Referring to FIG. 1, an air direction system 100 includes a fan shroud 110 and an electrically isolating baffle (hereinafter, the "baffle") 150 connected to and covered by the fan shroud 110. The fan shroud 110 covers the baffle 150 (see, e.g., FIG. 2) such that the baffle 150 is not clearly visible in FIG. 1. An active cooling device and drivers 120 (described in more detail below), both of which are mounted to the baffle 150 and covered or substantially covered by the baffle 150, may be powered from an AC mains outlet via the power cord 101.

The fan shroud 110 is mounted to the baffle 150 via screws 181, but the present disclosure is not limited thereto. In other embodiments, the fan shroud 110 may be mounted to the baffle 150 by any suitable connection mechanism, such as a snap-fit mechanism. In yet other embodiments, the fan shroud 110 may be fitted over the baffle 150 without being physically fixed thereto (e.g., without being screwed thereto). In these embodiments, the baffle 150 may include mounting brackets 153 extending upwardly therefrom, and the fan shroud 110 may have corresponding openings therein at an upper part thereof through which the mounting brackets 153 extend. Thus, the fan shroud 110 is connected to the baffle 150 at least via the mounting brackets 153 of the baffle 150 extending through the corresponding openings in the fan shroud 110.

One or more drivers 120 may be mounted to the baffle 150 and exposed (or partially exposed) through the fan shroud 110 via openings therein. For example, in FIG. 1, an upper surface of one of the drivers 120 is flush or nearly flush with an outer surface of the fan shroud 110. This provides a nice aesthetic appearance while allowing for radiative and conductive cooling of the drivers 120 with the ambient environment. When the drivers 120 are recessed into or under the fan shroud 110, a worker or service technician is less likely to touch the drivers 120 or have the drivers 120 catch on their clothes or the like, thereby increasing safety. In other embodiments, however, the upper surface of the drivers 120 may protrude above the outer surface of the fan shroud 110 for increased exposure to ambient air.

In addition to shielding workers from the drivers 120, the fan shroud 110 also prevents or substantially prevents workers from accidentally touching any moving parts, such as fan blades, or electrical wiring, while also providing a neat exterior appearance. However, because air must flow through the fan shroud 110 to cool the grow light 200 and indirectly cool the drivers 120, vent portions 112, 113, 121, 122 are formed in the fan shroud 110. The vent portions 112, 113, 121, 122 may be portions of the fan shroud 110 that have openings therein to allow for the passage of air through the fan shroud 110. The vent portions 112, 113, 121, 122 may have any suitable shape, size, and/or arrangement of openings, and the vent portions 112, 113, 121, 122 may have the same or different opening shapes, sizes, and arrangements from each other. Further, each vent portion 112, 113, 121, 122 may include one or more sub-vent portions. In the illustrated embodiment, the vent portions 112, 113, 121, 122 include openings elongated in one direction and arranged adjacent each other in another, perpendicular direction, and the vent portions 112, 121, 122 each include a plurality of sub-vent portions. But the present disclosure is not limited to this arrangement.

Certain industry standards or requirements, such as those set forth by Underwriters Laboratory®, require that less than 15% of the exposed surface area of a fan shroud be ventilated (e.g., be open to the external environment). This presents unique challenges in cooling grow lights, such as enclosing not only an active cooling device, such as one or more fans, but also enclosing one or more drivers 120 and associated electrical wiring to power the grow light 200 while allowing for sufficient airflow to the grow light 200 and the drivers 120 while efficiently cooling the same.

As described in more detail below, the baffle 150 is formed (or shaped) to provide first and second active airflow sections 151.1, 151.2 that are open to the active cooling device (e.g., one or more fans) and an electrical conduit section 152 that is isolated from (e.g., separated or substantially sealed from) the active cooling device and the first and second active airflow sections 151.1, 151.2 and accommodates the drivers 120 and related electrical wiring. For ease of understanding, a single second airflow section 151.2 and a single electrical conduit section 152 will be described herein, but as can be seen in the figures, two second active airflow sections 151.2 and two electrical conduit sections 152 are provided in the illustrated embodiment. Each of the second active airflow sections 151.2 are the same or substantially the same except for their locations, and each of the electrical conduit sections 152 are the same or substantially the same except for their locations.

By providing the active airflow sections 151.1, 151.2 isolated (e.g., separate) from the electrical conduit sections 152, certain vent portions in the fan shroud 110 are not counted toward the 15% surface area maximum, thereby providing sufficient cooling while remaining compliant with relevant standards and requirements. For example, vent portions that do not open to an area housing a moving component are not counted toward the 15% surface area maximum.

For example, the fan shroud 110 includes an active cooling vent portion 112 on an upper surface (e.g., an upper surface in the vertical direction or z-direction) of the fan shroud 110, which acts as an air intake vent for the active cooling device. The active cooling device may be, for example, one or more fans, such as an array of axial fans, but the present disclosure is not limited thereto. The fan shroud 110 may further include sidewall vent portions 113 on sidewalls (e.g., sidewalls in the length direction or the x-direction) of the fan shroud 110.

Air may flow into (e.g., may be pulled into) the fan shroud 110 via the active cooling vent portion 112, be accelerated by the active cooling device toward a heatsink 210 of the grow light 200, and then travel along the heatsink 210 through channels 211 to be exhausted from under the fan shroud 110. The sidewall vent portions 113 allow for two-way exchange of air between the ambient environment and the accelerated cooling air (e.g., the air that has been accelerated by the active cooling device). The sidewall vent portions 113 prevent or substantially prevent pressure buildup within the fan shroud 110 or a partial vacuum (e.g., a relatively low pressure condition) within the fan shroud 110. Either of these situations may reduce cooling efficiency, increase wear on the active cooling device, and cause an undesirable noise or vibration.

The fan shroud 110 may further include first and second driver vent portions 121, 122 to passively cool the drivers 120. As described in more detail below, the baffle 150 isolates the electrical conduit sections 152 from the first and second active air flow sections 151.1, 151.2, and the drivers 120 are respectively arranged in the electrical conduit sections 152. In this way, the drivers 120 are physically isolated (e.g., physically separated) from the active cooling device, thereby improving safety by reducing the risk of an electrical short or the like or a wire contacting a moving part. Further, because the first and second driver vent portions 121, 122 are only open to the electrical conduit sections 152, the openings of the first and second driver vent portions 121, 122 are not counted toward the 15% maximum open surface area, thereby allowing for improved device cooling and packaging while satisfying industry standards and requirements for safety and the like.

The first driver vent portion 121 may be arranged on sides of the driver 120 (e.g., lateral sides of the drivers 120 in the x-direction), and the second driver vent portion 122 may be arranged below the drivers 120 toward the grow light 200. In this way, natural convection cooling of the drivers 120 can occur by air entering the second driver vent portion 122, cooling the driver 120, and then exiting the fan shroud 110 via the first driver vent portion 121.

Figure 2:
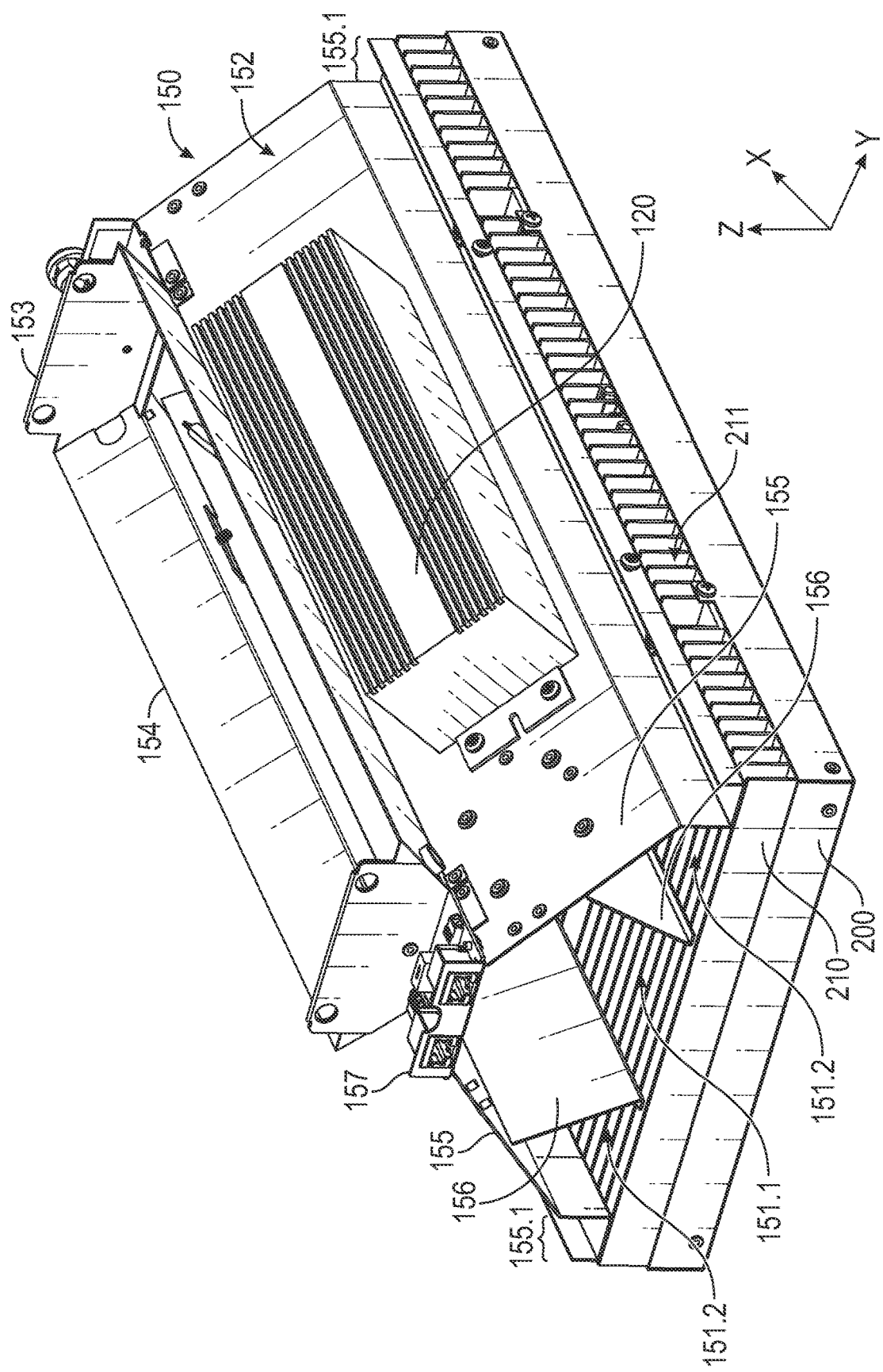
FIG. 2 is a perspective view of FIG. 1 with the fan shroud removed to show the electrically isolating baffle.
Figure 3:
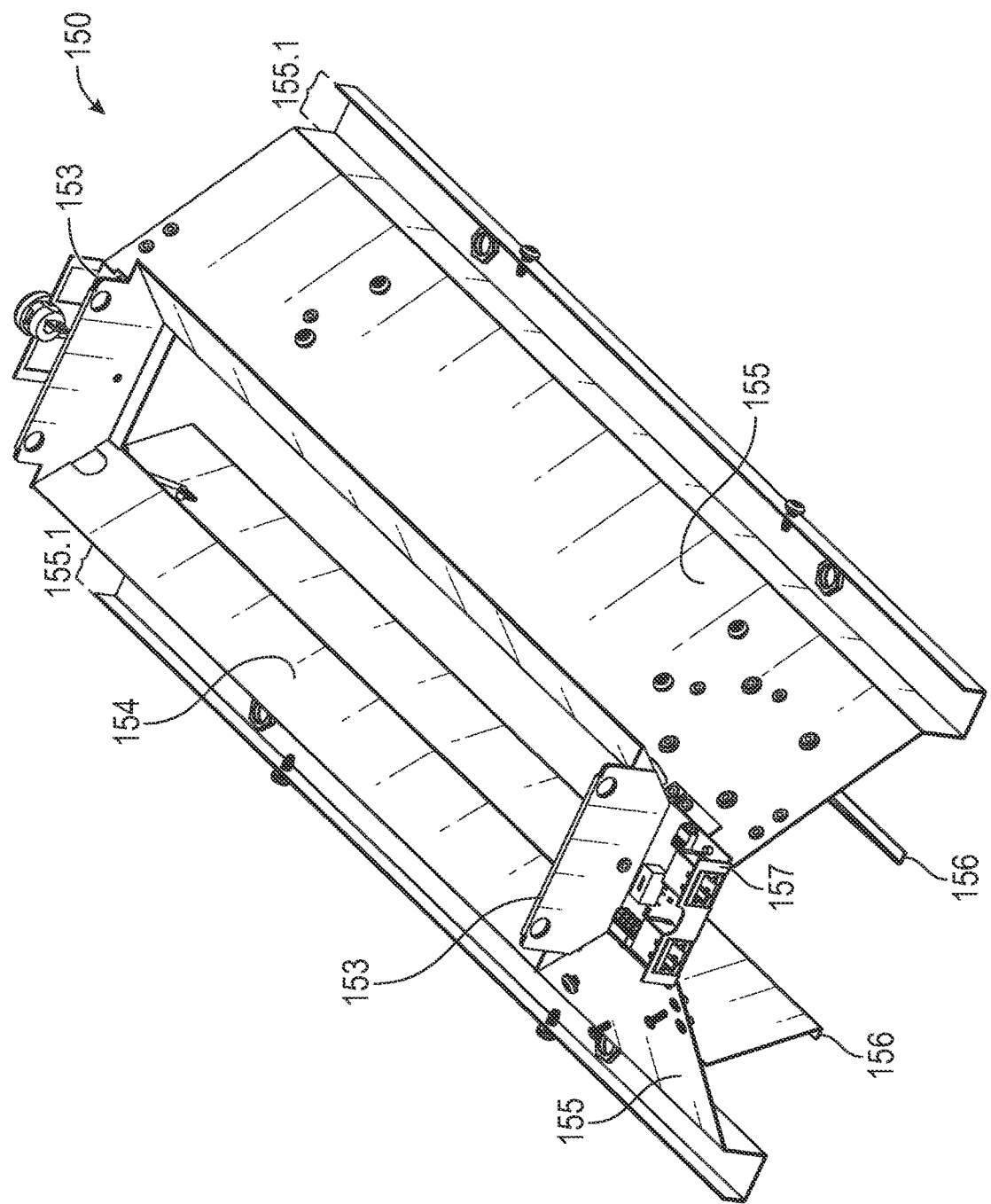
FIG. 3 is a perspective view of the electrically isolating baffle shown in FIGS. 1 and 2 with the horticulture grow light omitted.
Figure 4:
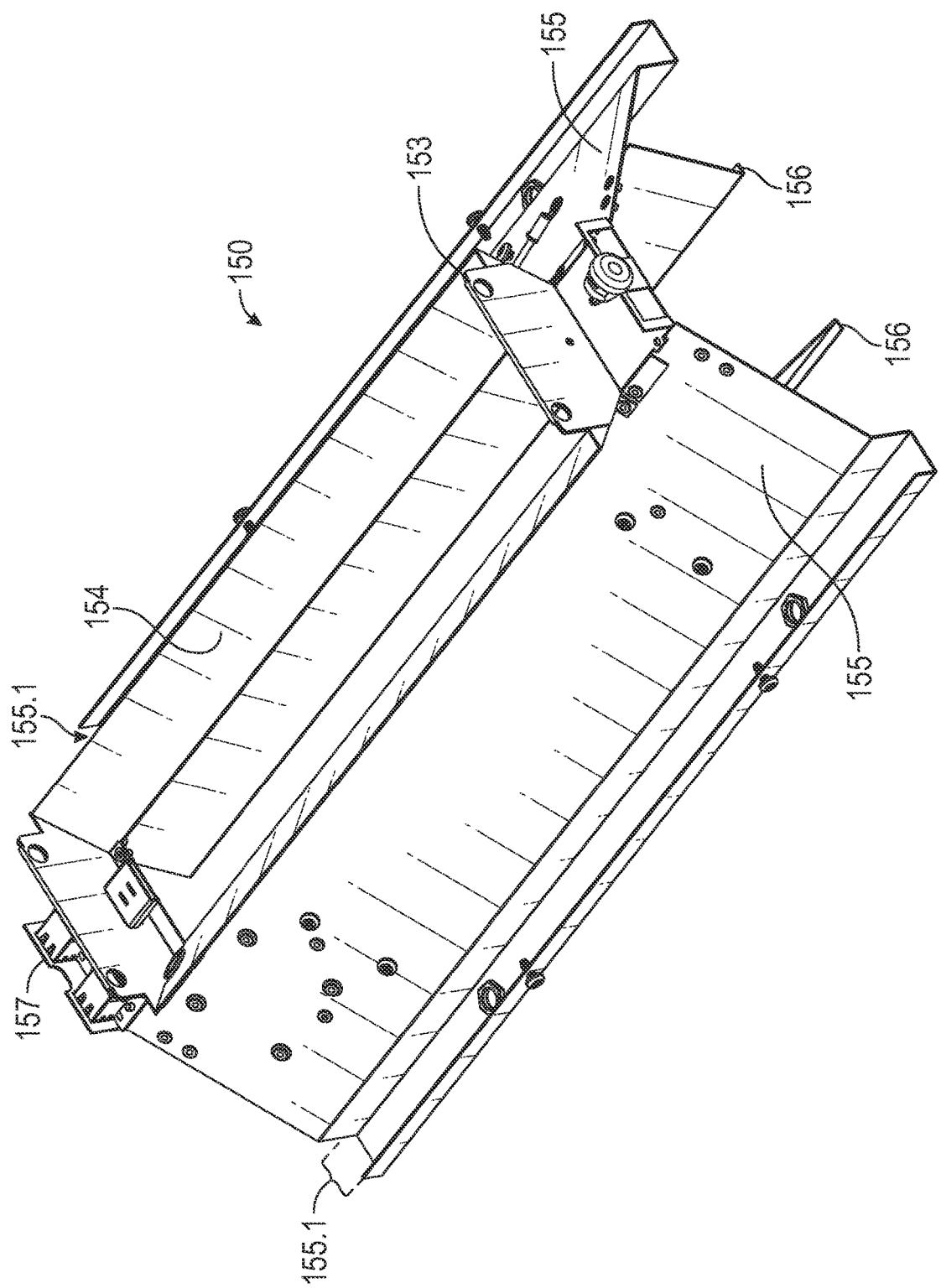
FIG. 4 is another perspective view of the electrically isolating baffle shown in FIG. 3.
Figure 5:
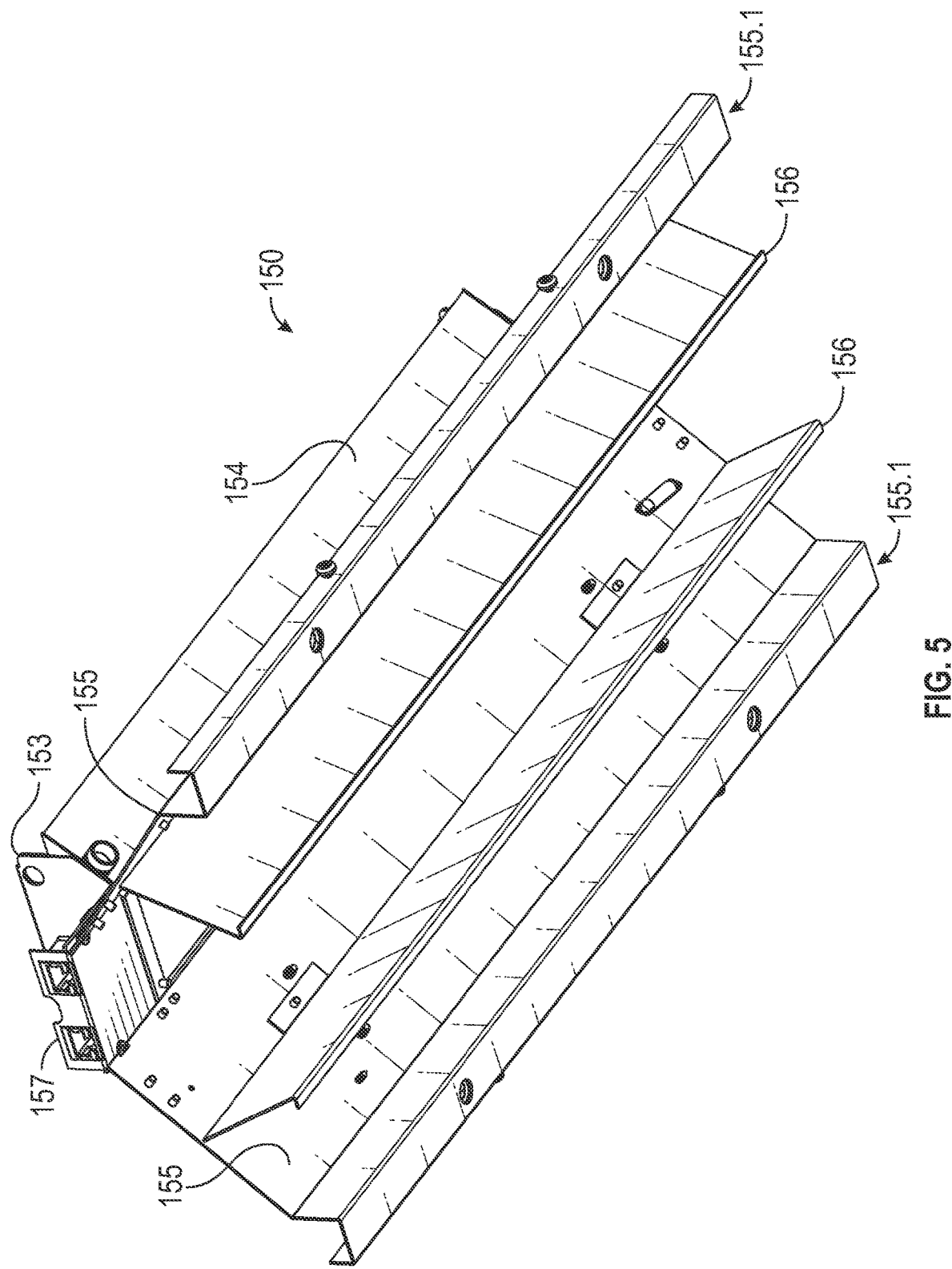
FIG. 5 is a bottom-side perspective view of the electrically isolating baffle shown in FIGS. 3 and 4.
Figure 6:
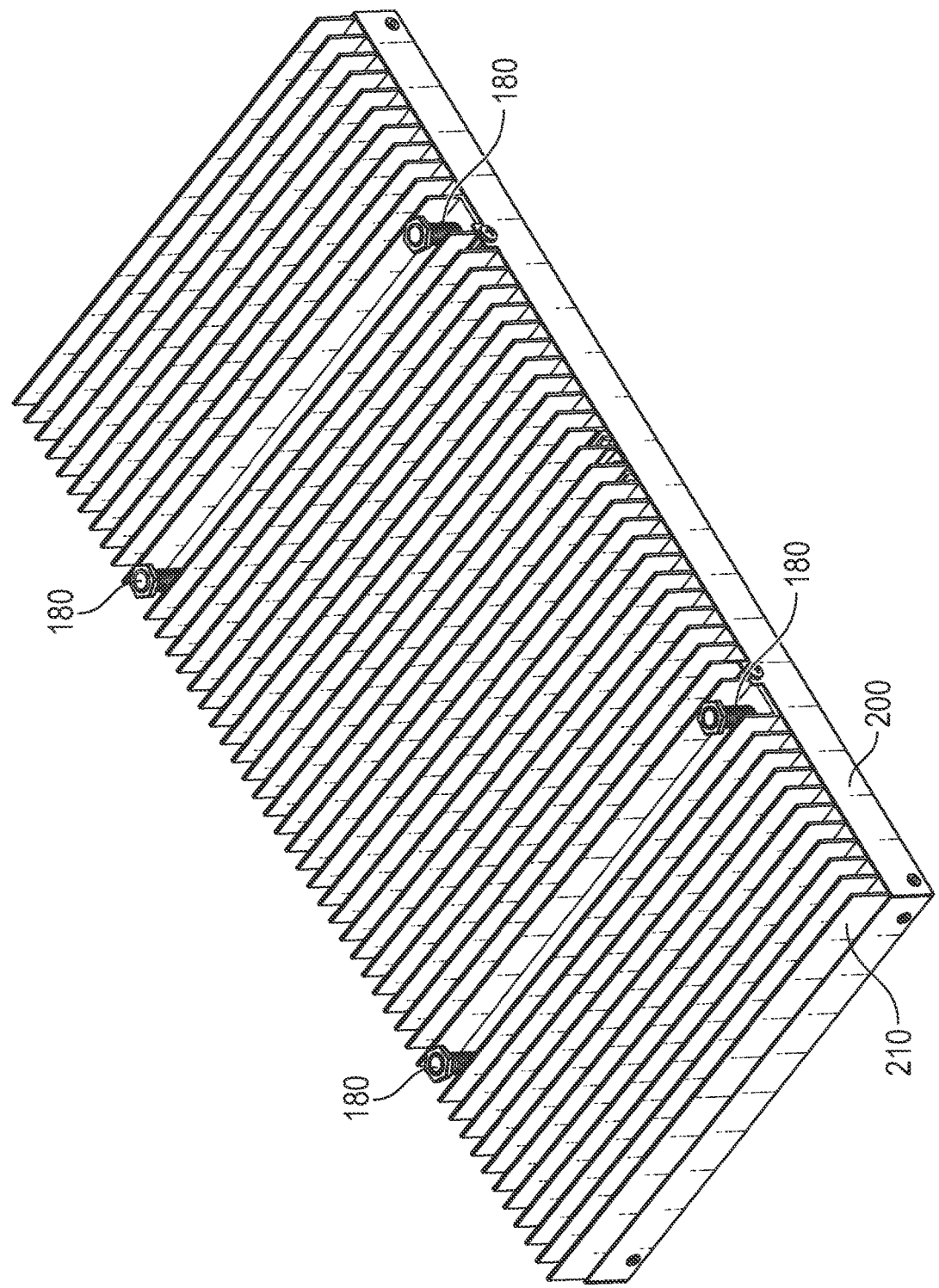
FIG. 6 is a perspective view of the horticulture grow light shown in FIG. 1.

In FIG. 2, the baffle 150 is shown mounted to the grow light 200 with the fan shroud 110 removed, and in FIGS. 3-5, the baffle 150 is shown with both the fan shroud 110 and the grow light 200 removed.

Referring to FIGS. 2-6, the first and second active airflow sections 151.1, 151.2 and the electrical conduit sections 152 are more visible with the fan shroud 110 removed. The baffle 150 includes an air funnel 154, driver panels 155, support panels 156, and a communication panel 157. Various commands may be issued to the grow light 200 via communication ports, such as dimming commands, spectral shift command, etc., that are arranged on the communication panel 157. Further, a fan fail signal may be sent to a controller via one or more of the communication ports when it is determined that the active cooling device has failed (e.g., by detecting a change in current flow to the active cooling device, etc.). Further, when the fan fail signal is sent to the controller, the grow light 200 may, independent of any command from the controller, dim (e.g., reduce light output) to avoid the grow light 200 overheating in the absence of the active cooling device.

The air funnel 154 is a top of the baffle 150 and houses the active cooling device (not shown). For example, the active cooling device may be mounted at the lowest and/or narrowest part of the air funnel 154. The air funnel 154 may direct ambient air that has passed through the active vent portion 112 to the active cooling device by including two or more panels arranged at an angle (e.g., at an angle between about 10° and 60°) with respect to the z-direction. In the illustrated embodiment, two of the panels forming the air funnel 154 are provided at an angle with respect to the z-direction while the other two panels, which include the mounting brackets 153, are parallel or substantial parallel to the z-direction (e.g., are not provided at an angle with respect to the z-direction). The air funnel 154 may help accelerate the ambient air toward the active cooling device, ensuring adequate air flow to the active cooling device and preventing or substantially preventing any pressure differential that could cause premature wear or unpleasant noise.

The driver panels 155 extend from the air funnel 154 (e.g., from the lowest and/or narrowest part of the air funnel 154) toward the grow light 200 at an angle (e.g., at an angle between about 30° and 60°) with respect to the z-direction. In some embodiments, the angle of the angled panels of the air funnel 154 and the angle of the driver panels 155 may be equal but opposite about the y-direction. The driver panels 155 may extend from the air funnel 154 to the heatsink 210 of the grow light 200.

Each of the driver panels 155 may include a driver support panel on which the driver 120 is mounted and an electrical conduit channel 155.1 at a distal end of the driver support panel. A bottom of the electrical conduit channels 155.1 may rest on or contact the heatsink 210 of the grow light 200.

The electrical conduit channel 155.1 may have three sides and an open top surface such that a U-shaped channel is provided. At a plurality of locations along each of the electrical conduit channels 155.1, an opening is provided through which hollow bolts 180 pass to connect the baffle 150 to the grow light 200. In addition, the hollow bolts 180 allow for electrical connections to be made between the drivers 120 and the grow light 200 without exposing the electrical wiring outside the device. That is, even someone handling the grow light 200 with the air direction system 100 attached thereto would not come into contact with any exposed electrical wiring even at the heatsink 210 due to wiring passing through the hollow bolts 180 to reach the grow light 200.

At about halfway along the height of each of the driver panels 155, a support panel 156 is provided. For example, as can be seen in FIG. 2, the support panels 156 are arranged at about a center line of the drivers 120 in the z-direction, which allows the support panels 156 to support (e.g., directly support) the weight of the drivers 120 on the driver panels 155. The support panels 156 may extend from the respective driver panels 155 at an angle between about 60° and about 120°. In some embodiments, the support panels 156 may extend normal or substantially normal to (e.g., at 90° or about 90° with respect to) the corresponding driver panels 155 to contact the heatsink 210 of the grow light 200.

The support panels 156 may be mounted to the driver panels 155 such that, in a relaxed state before the baffle 150 is attached to the grow light 200, the support panels 156 extend below the bottom surface of the electrical conduit channels 155.1. In this way, when the baffle 150 is attached to the grow light 200, contact between the support panels 156 and the heatsink 210 is ensured, and the support panels 156 bend or spring after contacting the heatsink 210, thereby applying pressure against the heatsink 210 and ensuring a good seal between the support panels 156 and the heatsink 210 to separate the first and second active airflow sections 151.1, 151.2.

Referring to FIG. 2, the first and second active air flow sections 151.1, 151.2 and the electrical conduit sections 155.1 are shown. As air enters through the active vent portion 112, it is accelerated by the air funnel 154 toward the active cooling device and then further accelerated by the active cooling device toward the heatsink 210 of the grow light 200. After exiting the active cooling device, the air enters the first active airflow section 151.1. As can be seen, a width of the first active airflow section 151.1 in the y-direction first increases until reaching the support panels 156, at which point the width of the first active airflow section 151.1 decreases due to angle of the support panels 156. For example, the air is first directed by inner sides of the driver panels 155 and is then directed by inner surfaces of the support panels 156. By increasing and then decreasing the width of the first active airflow section 151.1, the air from the active cooling device is further accelerated toward the heatsink 210 and the formation of a boundary layer of stagnant air is prevented or substantially prevented. Further, the air indirectly cools the drivers 120 by cooling the inner surfaces of the driver panels 155 as it passes along the driver panels 155.

At the end of the support panels 156, the first active airflow section 151.1 terminates into (e.g., ends at) the heatsink 210. The heatsink 210 may include a plurality of parallel channels 211 extending in either the x- or y-direction. In the illustrated embodiment, the channels 211 of the heatsink 210 are shown as extending in the y-direction and being adjacent each other in the x-direction, but the present disclosure is not limited thereto. Thus, the air contacts a bottom of the channels 211 of the heatsink 210 and moves along a length of the channels 211. Due to the impact of the air with the heatsink 210, a local pressure increase may be experienced at or just above the heatsink 210 in the first active airflow section 151.1, but due to the sidewall vent portions 113 in the fan shroud 110, some of the air may be exhausted out of the fan shroud 110 from the first active airflow section 151.1 to prevent or substantially prevent any local pressure increase.

After the air passes through the channels 211 and past (e.g., under) the support panels 156, some of the air will be pulled into the second active airflow sections 151.2. For example, some of the air will naturally exit a top of the channels 211 of the heatsink 210 to fill the second active airflow sections 151.2 behind (e.g., at outer surfaces of) the support panels 156. The second active airflow sections 151.2 may be formed by the outer surfaces of the support panels 156, the inner surfaces of the driver panels 155, and inner surfaces of the electrical conduits 155.1 of the driver panels 155. The air may become (or may stay) turbulent as it enters the second active airflow sections 151.2, thereby creating backpressure and turbulent airflow through the outer portion of the channels 211 of the heatsink 210, while also indirectly cooling the drivers 120 through the driver panels 155. Further, unlike the first active airflow section 151.1, the second active airflow sections 151.2 are not open to the ambient environment through any vent portions in the fan shroud 110; thus, any pressure in the second active airflow sections 151.2 is not naturally balanced with the ambient environment to assist with creating or maintaining turbulent airflow. By creating turbulent airflow at the ends of the channels 211 of the heatsink 210, a boundary layer of air may not form in the channels 211, thereby improving cooling efficiency. Finally, the air passes through the channels 211 of the heatsink 210 past (e.g., under) the electrical conduits 155.1 and exits the heatsink 210 to the ambient environment.

In some embodiments, a volume of the first active airflow section 151.1 may be greater than one or both of the second active airflow sections 151.2. In some embodiments, the volume of the first active airflow section 151.1 may be greater than a combined volume of both of the second active airflow sections 151.2.

The baffle 150 may further include the communication panel 157, which includes one or more communication ports. By including a plurality of communication ports, a daisy chain-type connection may be enabled between a plurality of separate devices (e.g., one of the communication ports may be in incoming port and another one of the communication ports may be an outgoing port). The connection ports may, as one example, be configured to accept RJ45 connectors, and the communication may occur over a CAN bus or any suitable protocol or interface.

Figure 7:
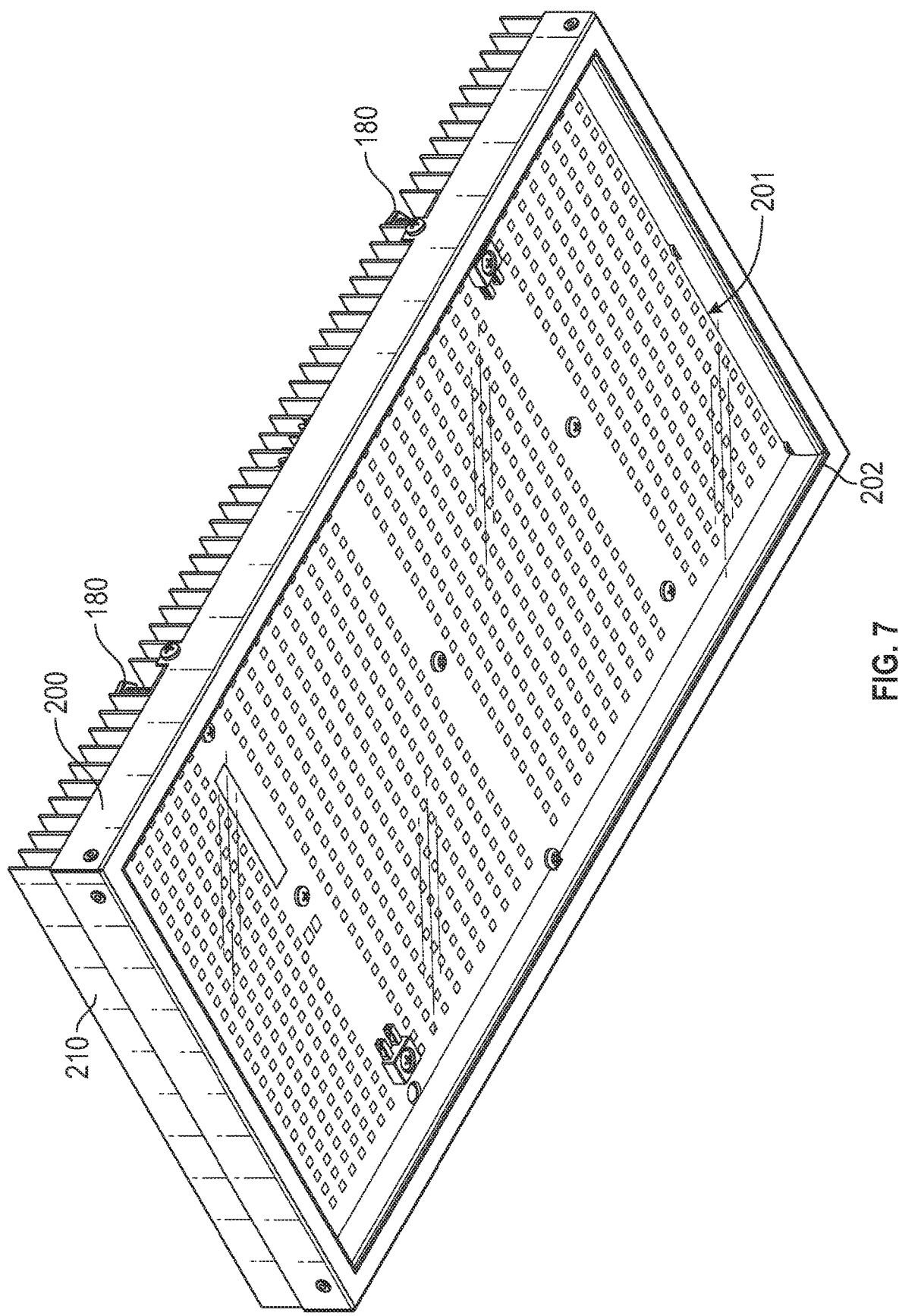
FIG. 7 is a bottom-side perspective view of the horticulture grow light shown in FIG. 6.

Referring to FIG. 7, a bottom of the grow light 200 is visible. The grow light 200 may include an emitter array 201 including a plurality of cool white light-emitting diodes (LEDs) and a plurality of warm white LEDs. The cool white LEDs may have a color temperature in a range from 5000K to 8000K. The warm white LEDs may have a color temperature in a range from 2000K to 3000K.

The cool white LEDs may be driven by one of the drivers 120, and the warm white LEDs may be driven by the other one of the drivers 120. The drivers 120 may be electrically connected to the emitter array 201 via the hollow bolts 180. By utilizing two separate drivers 120, the combined light output (e.g., the intensity and/or spectral output) of the grow light 200 may be varied by varying the current provided the cool white LEDs and the warm white LEDs.

In one embodiment, the quantity of cool white LEDs may be equal to the quantity of warm white LEDs. In such an embodiment, a ratio of the quantity of cool white LEDs to the quantity of warm white LEDs may be 1:1. In other embodiments, the quantity of cool white LEDs may be greater than the quantity of warm white LEDs. For example, a ratio of the quantity of cool white LEDs to the quantity of warm white LEDs may be in a range from 1.1:1 to 5:1, such as 2:1, 3:1, 4:1, or 5:1.

The cool and warm LEDs may be arranged in alternating rows (or strips) (e.g., each row may include either only cool LEDs or only warm LEDs). In another embodiment, the cool and warm LEDs may be arranged in an alternating matrix (e.g., one type of LED may be surrounded three or more sides by the other type of LED).

In some embodiments, a cover panel 202 may be provided to cover the emitter array 201. The cover panel 202 may include (or may be formed of) glass (e.g., AR glass) or plastic and may be transparent. When glass is used as the cover panel 202, it may be tempered for improved safety. The cover panel 202 may be fitted into a groove in the grow light 200. In this way, the grow light 200 including the air direction system 100 may be considered to be effectively sealed to prevent injury to workers and service technicians by having all moving parts and electrical connections contained within the fan shroud 110 and the cover panel 202 of the grow light 200.

Although the present disclosure has been described with reference to the example embodiments, those skilled in the art will recognize that various changes and modifications to the described embodiments may be made, all without departing from the spirit and scope of the present disclosure. Furthermore, those skilled in the various arts will recognize that the present disclosure described herein will suggest solutions to other tasks and adaptations for other applications. It is the applicant's intention to cover, by the claims herein, all such uses of the present disclosure, and those changes and modifications which could be made to the example embodiments of the present disclosure herein chosen for the purpose of disclosure, all without departing from the spirit and scope of the present disclosure. Thus, the example embodiments of the present disclosure should be considered in all respects as illustrative and not restrictive, with the spirit and scope of the present disclosure being indicated by the appended claims and their equivalents.

What is claimed is:

1. A horticulture grow light comprising:
   an emitter array;
   a heatsink on one side of the emitter array;
   a driver electrically connected to the emitter array; and
   an electrically isolating baffle connected to the heatsink,
      the baffle comprising:
      an air funnel;
      a plurality of driver panels respectively connected at opposite sides of the air funnel and extending toward the heatsink; and
      a plurality of support panels respectively connected to the driver panels and extending toward the heatsink,
   wherein a first active airflow section is formed between inner surfaces of the driver panels and inner surfaces of the support panels, and
   wherein second active airflow sections are respectively formed on either side of the first active airflow section and between the inner surfaces of the driver panels and outer surfaces of the support panels.

2. The horticulture grow light of claim 1, wherein the heatsink comprises a plurality of channels extending in a first direction and arranged adjacent each other in a second direction perpendicular to the first direction, and
wherein each of the driver panels extends toward the heatsink at an angle between 30° and 60° with respect to the first direction.

3. The horticulture grow light of claim 2, wherein the support panels are respectively connected to the driver panels at an area between a proximal end and a distal end of the driver panels.

4. The horticulture grow light of claim 3, wherein each of the driver panels comprises an electrical conduit channel at the distal end thereof.

5. The horticulture grow light of claim 4, wherein the electrical conduit channels contact the heatsink.

6. The horticulture grow light of claim 5, wherein the electrical conduit channels have openings therein, and
wherein the heatsink is connected to the baffle via hollow bolts passing through the openings in the electrical conduit channels.

7. The horticulture grow light of claim 6, wherein the driver is mounted on one of the driver panels, and
wherein electrical wiring between the driver and the emitter array passes through at least one of the hollow bolts.

8. The horticulture grow light of claim 1, wherein a width of the first active airflow section first increases in a first direction from the air funnel toward the heatsink and then decreases in the first direction.

9. The horticulture grow light of claim 8, wherein a width of each of the second active airflow sections increases in the first direction.

10. The horticulture grow light of claim 8, wherein the support panels separate the first active airflow section from the respective second active airflow sections.

11. The horticulture grow light of claim 10, wherein air flows from the first active airflow section, through the heatsink and under one of the support panels, and into a corresponding one of the second active airflow sections before exiting the heatsink.

12. An air direction system for a horticulture grow light, the air direction system comprising:
a fan shroud; and
an electrically isolating baffle under the fan shroud, the baffle comprising:
an air funnel;
a plurality of driver panels extending from opposite sides of the air funnel; and
a plurality of support panels respectively extending from the driver panels.

13. The air direction system of claim 12, wherein the driver panels extend at an angle between 30° and 60° with respect to a bottom of the air funnel, and
wherein the support panels respectively extend from the driver panels at an angle between 60° and 120°.

14. The air direction system of claim 13, wherein each of the driver panels comprises a driver support panel and an electrical conduit channel, and
wherein the electrical conduit channel is at a distal end of the driver support panel.

15. The air direction system of claim 14, wherein each of the electrical conduit channels have a U-shaped cross-section with a plurality of openings extending through a bottom surface of the U-shaped cross-section.

16. The air direction system of claim 14, wherein the support panels are mounted to the driver support panels of the respective driver panels.

17. The air direction system of claim 16, wherein a distal end of the support panels is on a same plane as the bottom of the electrical conduit channels.

18. The air direction system of claim 16, wherein a first active airflow section is formed between inner surfaces of the driver panels and inner surfaces of the support panel, and
wherein a plurality of second active airflow sections are formed on opposite sides of the first active airflow section.

19. The air direction system of claim 18, wherein one of the second active airflow sections is formed between the inner surface of one of the driver panels and an outer surface of a corresponding one of the support panels.

20. The air direction system of claim 19, wherein a volume of the first active airflow section is greater than a volume of one of the second active airflow sections.

* * * * *